United States Patent [19]

Newkirk et al.

[11] Patent Number: 4,884,737
[45] Date of Patent: Dec. 5, 1989

[54] METHOD FOR SURFACE BONDING OF CERAMIC BODIES

[75] Inventors: Marc S. Newkirk; Robert C. Kantner, both of Newark; Eugene S. Park, Hockessin, all of Del.

[73] Assignee: Lanxide Technology Company, LP, Newark, Del.

[21] Appl. No.: 53,215

[22] Filed: May 21, 1987

[51] Int. Cl.$^4$ .............................................. B23K 31/00
[52] U.S. Cl. ................................... 228/121; 228/248; 228/263.11
[58] Field of Search .................... 228/121, 198, 263.11, 228/263.12, 122, 248

[56] References Cited

U.S. PATENT DOCUMENTS

| | | |
|---|---|---|
| 2,741,822 | 4/1956 | Udy . |
| 3,255,027 | 6/1966 | Talsma . |
| 3,296,002 | 1/1967 | Hare . |
| 3,298,842 | 1/1967 | Seufert . |
| 3,419,404 | 12/1968 | Mao . |
| 3,421,863 | 1/1969 | Bawa . |
| 3,437,468 | 4/1969 | Seufert . |
| 3,473,938 | 10/1969 | Oberlin . |
| 3,473,987 | 10/1969 | Sowards . |
| 3,517,432 | 6/1970 | Sandstrom .......................... 228/121 |
| 3,789,096 | 1/1974 | Church . |
| 3,864,154 | 2/1975 | Gazza et al. . |
| 3,915,369 | 10/1975 | Schmidt-Brueken ............... 228/198 |
| 3,973,977 | 8/1976 | Wilson . |

FOREIGN PATENT DOCUMENTS

| | | |
|---|---|---|
| 0116809 | 8/1984 | European Pat. Off. . |
| 0135937 | 4/1985 | European Pat. Off. . |
| 0155831 | 9/1985 | European Pat. Off. . |
| 0169067 | 1/1986 | European Pat. Off. . |
| 0193292 | 9/1986 | European Pat. Off. . |
| 0030448 | 3/1978 | Japan .............................. 228/263.11 |
| 0134294 | 8/1982 | Japan .............................. 228/263.11 |
| 0097058 | 12/1983 | Japan .............................. 228/263.11 |
| 0057972 | 4/1984 | Japan .............................. 228/263.11 |
| 00811071 | 5/1985 | Japan ................................... 228/121 |
| 1117173 | 6/1986 | Japan .............................. 228/263.11 |
| 1127676 | 6/1986 | Japan .............................. 228/263.11 |
| 0917416 | 2/1963 | United Kingdom ................. 228/121 |

OTHER PUBLICATIONS

"Oxidation of Molten Aluminum Alloys, Reaction with Refractories"-M. Drouzy and M. Richard-Mar., 1974-Fonderie, France No. 332, pp. 121-128.
"Refractories for Aluminum Alloy Melting Furnaces'-'-B. Clavaud and V. Jost-Sep., 1980-Lillian Brassinga (from French), Jan., 1985.
Chemical Abstracts, vol. 105, No. 14, Oct. 1986, p. 291, abstract No. 119566r, Columbus, Ohio, U.S.; and JP-A-61 77 681, (Sumitomo Electric Industries, Ltd.).
Chemical Abstracts, vol. 105, No. 26, Dec. 1986, p. 287, abstract No. 231367c, Columbus, Ohio, U.S.; and JP-A-61 169 189, (Miyata Giken Y.K.).

Primary Examiner—Nicholas P. Godici
Assistant Examiner—Karen Skillman
Attorney, Agent, or Firm—Mark G. Mortenson; Michael K. Boyer

[57] ABSTRACT

Two or more ceramic bodies are bonded together by oxidizing with a vapor-phase oxidant molten metal obtained from a body of precursor metal to form an oxidation reaction product bond. The oxidation reaction product is formed between adjacent facing, substantially congruent surfaces of the ceramic bodies and bridges the surfaces, thus bonding the ceramic bodies to each other. Promoters may optionally be used to facilitate formation of the oxidation reaction product.

16 Claims, 2 Drawing Sheets

METHOD FOR SURFACE BONDING OF CERAMIC BODIES

BACKGROUND OF THE INVENTION

The present invention broadly relates to bonding ceramic bodies to each other, and, more specifically, relates to methods of and assemblies for bonding ceramic bodies to each other by forming an oxidation reaction product to bridge and thereby bond substantially congruent surfaces of the bodies.

SUMMARY OF THE INVENTION

In accordance with the present invention, there is provided a method of bonding ceramic bodies of each other along respective congruent surfaces thereof. A first ceramic body and a second ceramic body are positioned adjacent to each other, with a surface of the first body facing a surface of the second body, the surfaces being substantially congruent or coplanr to define a bonding zone between them. A precursor metal, e.g., an aluminum precursor metal, is oriented relative to the bonding zone so that an oxidation reaction product obtained upon oxidation of the precursor metal with a vapor-phase oxidant, as described below, is formed in the bonding zone. The resulting assembly or setup of ceramic bodies and precursor metal body is then heated in the presence of a vapor-phase oxidant to a temperature region above the melting point of the precursor metal and below the melting point of the oxidation reaction product to provide molten precursor metal, and, in that temperature region, the vapor-phase oxidant is treated with the molten precursor metal to form the oxidation reaction product. At least a portion of the oxidation reaction product is maintained in contact with and between the molten precursor metal and the oxidant, to progressively draw molten precursor metal from the pool or body of metal through the oxidation reaction product towards and into the bonding zone. The reaction is continued for a time sufficient to bridge the bonding zone with the oxidation reaction product and thereby bond the congruent surfaces to each other.

Other aspects and embodiments of the present invention are described below in the Detailed Description of the Invention and Preferred Embodiments Thereof.

As used in this specification and the appended claims, the terms below are defined as follows:

"Oxidation reaction product" generally means one or more metalsin any oxidized state wherein the metal has given up electrons to or shared electrons with another element, compound, or combination thereof. Accordingly, an "oxidation reaction product" under this definition includes the product of reaction of one or more metals with a vapor-phase oxidant described herein.

"Vapor-phase oxidant", which identifies the oxidant as containing or comprising a particular vaporized or gaseous material, means one or more suitable electron acceptors or electron sharers. Useful oxidants include an oxygen-containing gas (including air), a nitrogen-containing gas (e.g. forming gas), a halogen, sulfur, phosphorus, arsenic, carbon compounds (including the low molecular weight hydrocarbons such as methane, ethane, ethylene, propylene, and acetylene as the carbon source), selenium, tellurium, $H_2/H_2O$ mixtures and $CO/CO_2$ mixtures, and/or compounds or mixtures of such suitable oxidants.

"Precursor metal" or "parent metal" is intended to refer to relatively pure metals, commercially available metals with impurities and/or allowing constituents therein, and alloys and intermetallic compounds of the metal. When a specific metal is mentioned, the metal identified should be read with this definition in mind unless indicated otherwise by the context.

BRIEF DESCRIPTION OF THE DRAWINGS

FIG. 3 is a pictorial view of an assembly of a ceramic block and upwardly extending ceramic block having disposed therebetween a double layer of precursor metal foil with a promoter material.

FIG. 4 is a pictorial view of an assembly of three ceramic bodies comprising two blocks and an upwardly extending block.

DETAILED DESCRIPTION OF THE INVENTION AND PREFERRED EMBODIMENTS THEREOF

Figure 1:
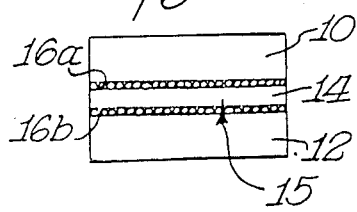
FIGS. 1, 3 and 4 are schematic elevational views, not to scale, of assemblies in accordance with respective embodiments of the invention, each assembly comprising ceramic bodies to be bonded together and having precursor metal sandwiched with additional space between the ceramic bodies.

In the practice of the present invention, two or more ceramic bodies are bonded together in a bonding zone defined by adjacent, facing and substantially congruent surfaces of the bodies. The facing, bondable surfaces may comprise planar or otherwise substantially congruent ceramic faces of abutting or adjacent bodies such as plates, disks, blocks, cubes, bars, or the like, whether or not shaped. Where desired, one or all of the ceramic bodies may be a ceramic composite comprising ceramic filler material embedded by a ceramic matrix. As used herein and in the claims, reference to the facing surfaces being "substantially congruent" does not require that the facing surfaces exhibit perfect or geometric congruence, but it suffices if they coextend over an area sufficient to establish a substantially coplanar bonding zone between them. Further, the surfaces need not be planar, but can be arcuate as, for example, the surface of one body being convex and the other body being concave, thereby providing matching or coplanar surfaces. The thickness of the bonding zone can be quite small, e.g. from about 2–3 one-thousandths to about 10 one-thousandths of an inch, or it may be larger.

The bonding is effectuated by an oxidation reaction product formed by oxidation of a coherent body of precursor metal (parent metal) which is oriented relative to the bonding zone so that oxidation reaction product formed from the precursor metal bridges, and bonds, the adjacent surfaces. The adjacent surfaces may be in contact with each other (or with a body of precursor metal) or may be slightly spaced apart, or may be disposed at a slight angle to each other to provide a small gap at one side of the bonding zone. A promoter material and/or the precursor metal may be, but are not necessarily, interposed between the adjacent surfaces. For example, the precursor metal may be provided as a foil or sheet sandwiched together with additional space between the adjacent surfaces, or it may be provided as one or more bodies of precursor metal positioned exteriorly of, but adjacent to, the bonding zone, e.g. in abutting contact with part or all of the perimeter of the bonding zone. Especially in the latter case, growth or development of the oxidation reaction product from the body of precursor metal extends from a point of origin outside the bonding zone and progresses into and at least partially through the bonding zone. In effect, the growth of oxidation reaction product enters into and extends at least part way through what may be the merest crack or seam between two ceramic bodies whose coplanar faces are in close or abutting contact.

Without wishing to be bound by any particular theory of operation. this growth phenomenon may be explained with reference to the teachings of Commonly Owned U.S. Pat. application Ser. No. 818,943, filed Jan. 15, 1986 U.S. Pat. No. 4713,360, issued Decc. 15, 1987.

According to the invention therein disclosed, a metal precursor, e.g., aluminum (referred to as a parent metal), is heated in the presence of a vapor-phase oxidant, e.g. air, to a temperature above its melting point, but below the melting point of the oxidation reaction product, to form a body of molten parent metal. In the case of an aluminum percursor metal and air as the oxidant, this temperature region is typically in the range of from about 850° to 1450° C. The molten parent metal is reacted with the vapor-phase oxidant to form an oxidation reaction product, which product is maintained at least partially in contact with, and extends between, the body of molten parent metal and the vapor-phase oxidant. In this temperature range, molten parent metal is transported through the previously formed oxidation reaction product, towards the vapor-phase oxidant. As the molten parent metal contacts the vapor-phase oxidant at the interface between the vapor-phase oxidant and previously formed oxidation reaction product, it is oxidized by the vapor-phase oxidant, and thereby grows or forms a progressively thicker layer or body of oxidation reaction product. The process is continued for a time sufficient to produce a ceramic body comprised of a polycrystalline oxidation reaction product (and also may have interconnected metallic constituents including nonoxidized parent metal). However, the process can be continued to oxidize all or nearly all the interconnected metal, and voids or porosity is developed in the body. The process may be enhanced by the use of an alloyed dopant, such as in the case of an aluminum parent metal oxidized in air utilizing magnesium and silicon as dopants. This method was improved by the use of external dopants applied to the surface of the precursor metal as disclosed in Commonly Owned U.S. patent application Ser. No. 220,935, filed June 23, 1988, which is a Rule 62 continuation of U.S. Ser. No. 822,999, filed Jan. 27, 1986, which is a continuation-in-part of Ser. No. 776,965, filed Sept, 17, 1985, which is a continuation-in-part of Ser. No. 747,788 filed June 25, 1985, which is a continuation-in-part of U.S. Ser. No. 632,636 filed July 20, 1984 in the name of Marc S. Newkirk, et al. and entitled "Methods of Making Self-Supporting Ceramic Materials and Materials Made Thereby".

While the present invention is described in detail with respect to aluminum precursor metals, other precursor metals such as titanium, tin, zirconium, hafnium and silicon precursor metals can be used in the practice of the invention.

Any suitable ceramic products can be used as the ceramic bodies to be bonded to each other, such as metal oxides, borides, carbides, or nitrides, which have been pressed and sintered or otherwise processed by conventional methods. Suitable ceramic bodies useful in the practice of this invention include, for example, such bodies comprising alumina, zirconia, silicon carbide, silicon nitride, titanium diboride, titanium nitride, or combinations thereof. The ceramic bodies are predominantly nonmetallic and inorganic in composition. If the ceramic bodies are relatively dense, that is, low porosity, the bonding surface of one or both bodies may be chemically etched or mechanically treated as by grit blasting to render the zone(s) adjacent to the surface(s) rougher in surface finish thereby enhancing the bond.

Figure 1A:
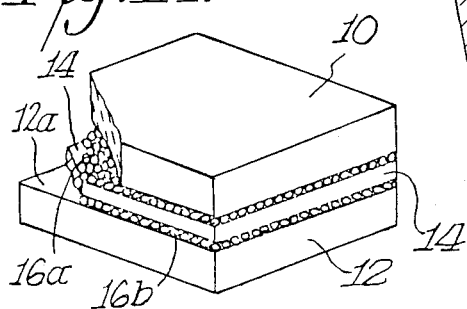
FIGS. 1A and 1B are perspective views of the assembly of FIG. 1, with segments broken away for improved clarity of illustration.
Figure 1B:
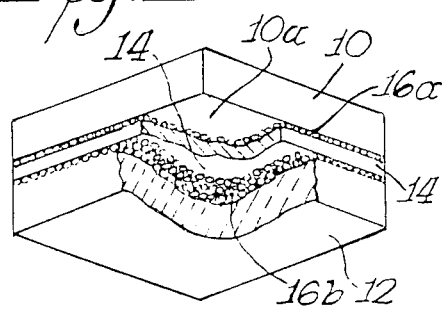

Referring now to the drawings, FIGS. 1, 1A, and 1B show a first ceramic body 10 placed adjacent to a second ceramic body 12 with a precursor metal foil body 14 sandwiched between the ceramic bodies. In the schematic drawings, the thickness of the foil body 14 relative to the thickness of ceramic bodies 10 and 12 is not necessarily drawn to scale, but rather for improved clarity. For example, precursor metal body 14 may be much thinner relative to the ceramic bodies than illustrated. Thus, foil body 14 may be 0.005 inch thick, or in the case of sheet may be from 0.010 to 0.020 inch thick, and ceramic bodies 10 and 12 each may be at least about 1/16 inch thick, or several inches thick, or considerably thicker.

Generally, precursor metal useful in the practice of the invention may have any suitable form, such as foils, sheets, plates, wires, rods, discs, plates or the like. One or more discrete pieces or bodies of precursor metal may be provided in any given assembly. For example, a fillet of precursor metal, such as of foil, could be flanked on its opposite side by lengths of precursor metal wires, and spaced at the junction of the ceramic bodies. In another example, the metal as foil or sheet may be folded back on itself (a U-bend, see FIG. 3) to double the thickness of metal at the junction of ceramic bodies.

Foil body 14 is coextensive with the bondable, substantially congruent surfaces 10a and 12a of, respectively, ceramic bodies 10 and 12 as best appreciated from FIGS. 1A and 1B. The facing surfaces 10a and 12a define between them a bonding zone. The major surfaces of foil body 14 may have been chemically or mechanically cleaned to remove oxide film from these surfaces. A promoter, which serves to facilitate oxidation of the precursor metal to form the oxidation reaction product as described below, may be used at one or both of the interfaces between foil body 14 and respective bondable surfaces 10a and 12a. Such deployment of promoter material is illustrated in FIGS. 1, 1A, and 1B by promoter material layers 16a and 16b, the thickness of which is greatly exaggerated for improved clarity. Suitable promoter materials may be applied to one or both of the major surfaces of foil body 14 and/or to one or both of bondable surfaces 10a and 12a. Promoter material useful in the practice of the invention include one or more sources of magnesium, zinc, silicon, germanium, tin, lead, boron, sodium, lithium, calcium, phosphorus, yttrium, and rare earth metal. The source of these metals may comprise the metal itself, alloys of the metals with each other or with other metals such as the precursor metal, or compounds of the metals or of two or more of the metal, such as oxides, silicates and the like. The source of promoter material may be used in conjunction with the precursor metal by being alloyed with the precursor metal, by being coated thereon or otherwise placed in close proximity thereto, or by a combination of such techniques. For example, promoter material in particulate form can be applied to one or both surfaces of the precursor metal or to one or more of the ceramic surfaces. Particles of promoter material can be dispersed in a suitable binder or vehicle and applied to the bonding surfaces or to the metal surfaces as shown at 16a and 16b. The vehicle or binder is normally an organic composition, such as polyvinyl alcohol, which is vaporized and/or combusted during the process and thus driven off.

Oxidation of precursor metal foil body 14 is carried out by heating the assembly of FIG. 1 to a temperature region above the melting point of the precursor metal but below the melting point of the oxidation reaction product formed from it by contact of the molten precursor metal with a suitable vapor-phase oxidant. This temperature interval in the case of aluminum as the precursor metal in air, for example, may range from about 800° to 1450° C., and more preferably 900° to 1350° C. A suitable promoter material may be deployed on the surface of the foil body 14. In practice, the assembly of FIG. 1 may be placed within a furnace which is vented to the air or otherwise equipped to circulate a vapor-phase oxidant therethrough. The assembly is heated to the required temperature region and maintained at that temperature for a time sufficient to develop or grow the oxidation reaction product and to bridge and bond surfaces 10a and 12a, thereby bonding ceramic bodies 10 and 12 to each other. In one embodiment of the invention, the precursor metal foil 14 is an aluminum precursor foil and ceramic bodies 10 and 12 comprise α-alumina formed by high temperature sintering of powders. For example, seven such assemblies as illustrated in FIG. 1 were prepared within two ceramic bodies corresponding to 10 and 12 comprising alumina (AD-85, from Coors Porcelain Co., Golden, CO), each measuring approximately ¾ inch length per side, were bonded together. Each of the seven assemblies employed a different promoter material selected from the group consisting of Ni, $Mn_3O_4$, ZnO, TiC, ZrN, CuO and $Fe_2O_3$. A section of aluminum foil 14 comprised of an aluminum alloy containing 10% by weight Si, and 3% by weight magnesium, balance aluminum, was coated on both sides with a mixture comprising 50 weight percent of the respective promoter material, and 50 weight percent sodium silicate. The coated sheet was then sandwiched between the above alumina blocks as shown in FIG. 1.

The seven assemblies were placed into a furnace supplied with air, and heated up over 30 minutes to 600° C. The furnace temperature was maintained at 600° C. for 1 hour, then heated up over 25 minutes to 1100° C. The furnace temperature was held at 1100° C. for 1 hour, and then cooled down to embient. Each assembly was removed from the furnace. Upon examination, each of the foil sheets had oxidized forming a ceramic bond, and thus the two alumina blocks had bonded.

Figure 2:
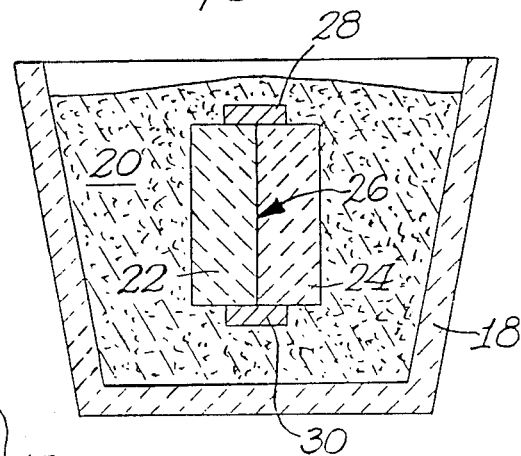
FIG. 2 is a schematic, cross-sectional view in elevation of an assembly in accordance with another embodiment of the invention and comprising ceramic bodies to be bonded together and precursor metal bodies, the assembly being embedded within a retaining bed contained in a refractory vessel.

Referring now to FIG. 2, a refractory vessel 18 contains a bed 20 of retainer material comprising a particulate material which is not wet by the precursor metal under the temperature conditions of the bonding process. Embedded within bed 20 is a pair of ceramic bodies 22 and 24 positioned with their respective bondable and substantially congruent surfaces in abutting contact to define therebetween a bondng zone 26. Ceramic bodies 22 and 24 are each of rectangular plate- or brick-like configuration with the bondable surfaces thereof being substantially flat. One or more ingots or billets of the precursor metal, such as rectangular, plate-shaped precursor metal bodies 28 and 30, are positioned, respectively, adjacent opposite segments of the periphery of bonding zone 26. The ceramic and precursor metal bodies are embedded within bed 20 which is permeable to a vapor-phase oxidant, such as air. The surfaces between which bonding zone 26 is formed may have a promoter material disposed thereon.

Figure 2A:
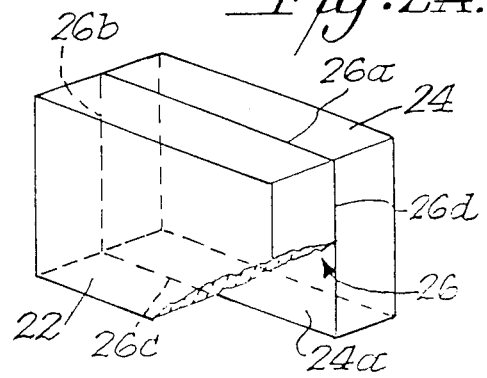
FIG. 2A is a perspective view on an enlarged scale of the ceramic bodies only of the assembly of FIG. 2, with a segment of one of the bodies broken away for improved clarity of illustration.

In FIG. 2A, a portion of ceramic body 22 is broken away to illustrated bondable surface 21a of ceramic body 24, surface 24a facing a corresponding bondable surface (not visible in FIG. 2A) of ceramic body 22 to define the bonding zone 26. The periphery of bonding zone 26 is defined by the respective mating edges of the ceramic bodies 22 and 24 and is indicated in FIG. 2A by the lines 26a, 26b, 26c, and 26d.

The assembly of FIG. 2 is placed in a suitable furnace and heated to a temperature region as described above with respect to the embodiment of FIGS. 1A and 1B. The molten precursor metal obtained from bodies 28 and 30 are oxidized by contact with a vapor-phase oxidant, say ambient air, which permeates bed 20 to contact the molten precursor metal and oxidize it to form oxidation reaction product which develops into and through bonding zone 26 or at least a significant portion thereof, thereby bridging the facing bondable surfaces and bonding them and their associated ceramic bodies 22 and 24 to each other. The ceramic bodies, typically being largely or entirely comprised of refractory compounds, easily withstand being heated within the aforesaid temperature region. When the reaction has been conducted for a time sufficient to bond ceramic body 22 to ceramic body 24 with the oxidation reaction product, the assembly is allowed to cool and the bonded ceramic bodies are removed from bed 20. Excess precursor metal, if any, resolidified on the surfaces of the bonded ceramic bodies may be removed by any suitable mechanical or chemical means.

Figure 3:
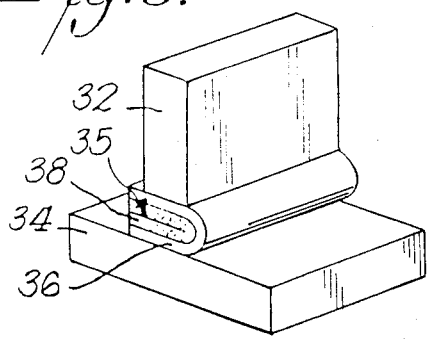

Referring now to FIG. 3, there is shown another embodiment in which the ceramic body 32 of flate, plate- or brick-like construction is vertically positioned with one of its narrow surfaces supported upon a horizontally positioned ceramic body 34 to define between the facing surfaces a bonding zone generally indicated at 35. A precursor metal body 36 such as foil or sheet, 36 is folded as a reverse bend to provide a double layer of foil, and positioned between ceramic bodies 32 and 34. The fold of metal body 36 is first coated with a layer 38 of a promoter material, such silicon particles which may be applied by spraying the surface of foil body 36 with a suspension of fine silicon particles in an appropriate liquid vehicle. The silicon serves as a promoter for oxidation of a precursor metal, such as an aluminum precursor metal. The assembly of FIG. 3 is processed in a manner similar to that described above to bond ceramic bodies 32 and 34 to each other.

Figure 4:
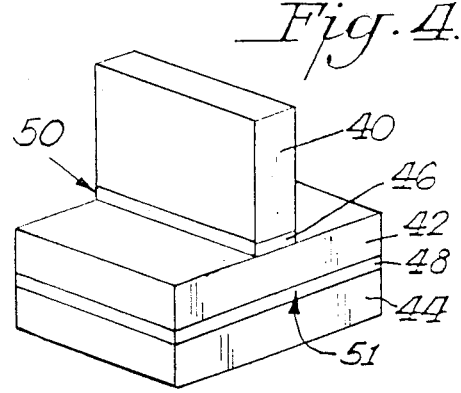

FIG. 4 illustrates another embodiment of the invention in which three ceramic bodies 40, 42, and 44, each of flat, plate- or brick-like configuration, are assembled with a precursor metal foil body 46 sandwiched between and coextensive with a narrow surface of ceramic body 40 and ceramic body 42, and a precursor metal foil body 48 sandwiched between and coextensive with ceramic bodies 42 and 44. As in the FIG. 3 embodiment, ceramic body 40 is positioned vertically upon horizontally disposed ceramic body 42. A bonding zone generally indicated at 50 is thus defined between the facing, substantially congruent surface portions of ceramic body 40 and ceramic body 42, and a bonding zone generally indicated at 51 is similarly formed between ceramic body 42 and ceramic body 44.

Precursor metal foil or sheet bodies 46 and 48 may comprise an aluminum precursor metal and part or all of the surfaces thereof, and/or part or all of the bondable surfaces of ceramic bodies 40/42 and 42/44 may have suitable promoter materials applied thereto. Upon heating of the assembly of FIG. 4 to melt precursor metal bodies 46 and 48 in an oxidizing environment, the precursor metal bodies are oxidized to form oxidation reaction product with, respectively, bonding zones 50 and 51, and thereby bond ceramic body 40 to ceramic body 42 and ceramic body 42 to ceramic body 44.

Practice of the invention is illustrated by the following examples.

EXAMPLE 1

Assemblies of the type illustrated in FIG. 3 were prepared, except that a single layer of aluminum alloy containing 10% weight silicon and 3% by weight magnesium, measuring approximately 0.01 inch in thickness with no promoter was substituted for the silicon-coated, folded foil of FIG. 3 to serve as the precursor metal body. Ceramic blocks corresponding to ceramic bodies 32 and 34 were arranged as in FIG. 3 with the single foil layer sandwiched between the blocks and not extending beyond the bonding zone defined between the blocks. In this and in all following examples, unless otherwise specified, the major block faces measured approximately 1 inch by ½ inch and the blocks were about ¼ inch thick and comprised Coors alumina (AD-85).

Three assemblies were placed in a furnace and heated in air at temperatures, respectively, of 800°, 900°, and 1150° C. for 24 hours in order to oxidize the aluminum precursor metal foil body to an alumina oxidation reaction product and thereby bond the ceramic block together. Bond strength for each was considered good which showed that bonding can be obtained even without the use of promoters.

EXAMPLE 2

An assembly of ceramic blocks and silicon-coated precursor metal as illustrated in FIG. 3 was prepared. The precursor metal was comprised of the same aluminum alloy in Example 1, and was approximately 0.01 inch thick. The silicon layer applied to a slurry to one side of it was 0.004 inch thick. The silicon-coated metal was folded on itself and the assembly prepared as in FIG. 3, with the silicon coating on the inside of the folded metal. The components were initially held in place by application of Elmers®Wood Glue. The glued assembly was heated in air at 1150° C. for 24 hours. The finished product exhibited good bond strength.

EXAMPLE 3

A block of precursor metal comprising aluminum alloy designated 380.1 (from Belmont Metals, having a nominally identified composition by weight of 8–8.5% Si, 2–3% Zn, and 0.1% Mg as active dopants, and 3.5% Cu as well as Fe, Mn, and Ni but the actual Mg content was sometimes higher as in the range of 0.17–18%), measuring 1 inch long by ½ wide by ½ inch thick was placed into a support bed of refractory fibers (Wollastonite, a mineral calcium silicate, FP grade from Nyco Inc.) contained in a refractory vessel such that one 1-inch by ½-inch side of the metal was exposed to the atmosphere and substantially flush with the surface of the support bed, while the remaining five sides of the precursor metal were submerged beneath the surface of the support bed. Two block-shaped alumina bodies (Coors AD-85), from Coors Procelain Co., Golden, CO), each measuring 1 inch long by ½ inch wide by ½ inch thick, were positioned adjacent to one a ½ inch square side of each block faced and abutted that of the other block with an approximately 1/16 inch space or bonding zone therebetween. furnace temperature was held at 1100° C. for 15 hours, and cooled back down to ambient. The setup was removed from the furnace, and the resulting product was recovered.

Figure 5:
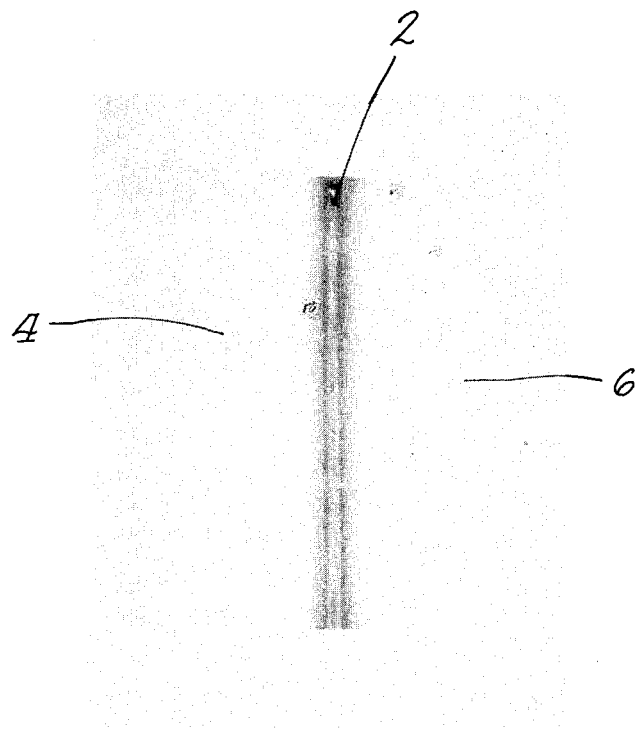
FIG. 5 is a photograph at 2.5×magnification of the bonded ceramic product in Example 3.
Figure 6:
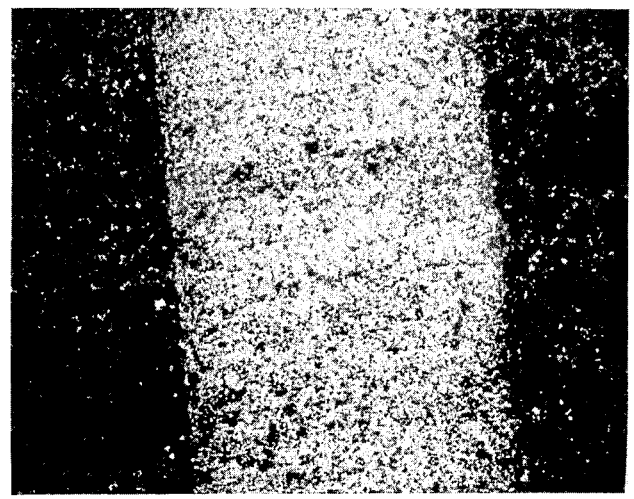
FIG. 6 is a photomicrograph at 50×magnification showing the ceramic product bonded by the process of Example 3.

Examination of the recovered product showed that the two alumina bodies had been bonded together. An alumina ceramic bond, comprising the oxidation reaction product of the precursor metal and air, had formed between the abutting ½-inch square sides of the alumina bodies in the bonding zone. FIG. 5 is a photograph showing the ceramic bond 2 between alumina blocks 4 and 6. FIG. 6 is a photomicrograph at 50×magnificatin showing the same bonded alumina bodies and the bond.

The bonded product was ground such that the surfaces of the ceramic bond were flush with the surfaces of the bonded alumina bodies. The ground product was then tested (4 point bend) to test the strength of the bond. The bonded product fractured under 8000 lbs/in$^2$ across the width of one of the alumina ceramic bodies, and not across the formed ceramic bond.

What is claimed is:

1. A method of bonding ceramic bodies to each other along substantially congruent surfaces, comprising:
   (a) positioning a first cermic body and a second ceramic body adjacent to each other with a surface of said first body facing a surface of said second body to define a bonding zone therebetween;
   (b) orienting a body of precursor metal relative to said bonding zone so that an oxidation reaction product obtained from said precursor metal in step (c) below is formed in said bonding zone;
   (c) heating the resultant assembly of said ceramic bodies and said body of precursor metal in the presence of a vapor-phase oxidant to a temperature region above the melting point of said precursor metal and below the melting point of said oxidation reaction product to provide a body of molten precursor metal; and
   (d) in said temperature region,
      (i) reacting said vapor-phase oxidant with said molten precursor metal to form said oxidation reaction product; p2 (ii) maintaining at least a portion of said oxidation reaction product in contact with and between said molten precursor metal and said oxidant, to progressively draw molten precursor metal from said body through the oxidation reaction product and into said bonding zone; and (iii) continuing such reacting for a time sufficient to bridge said bonding zone with said oxidation reaction product and thereby bond said surfaces to each other.

2. The method of claim 1 wherein said ceramic bodies comprise a material selected from the group consisting of ceramic oxides, borides, carbides, and nitrides, said vapor-phase oxidant comprising an oxygen-containing gas.

3. The method of claim 2 wherein said ceramic bodies comprise alumina.

4. The method of claim 1, claim 2, or claim 3 wherein said vapor-phase oxidant is air.

5. The method of claim 1, claim 2, or claim 3 including orienting said body of precursor metal by placing it at the periphery of said bonding zone.

6. The method of claim 1, claim 2, or claim 3 including positioning said ceramic bodies with said surfaces inclined at a small angle to each other.

7. The method of claim 1, claim 2, or claim 3 including orienting said body of precursor metal by placing it within said bonding zone.

8. The method of claim 7 wherein said body of precursor metal is sandwiched between said surfaces of said first and second bodies.

9. The method of claim 1 including promoting said oxidation reaction by using a promoter material in conjunction with said precursor metal.

10. The method of claim 9 wherein said precursor metal is an aluminum precursor metal.

11. The method of claim 10 wherein said promoter material is selected from the group consisting of one or more of sources of magnesium, zinc, silicon, germanium, tin, lead, boron, sodium, lithium, calcium, phosphorus, yttrium, and rare earth metals.

12. The method of claim 1, claim 2, or claim 3 wherein one or both of said first and second ceramic bodies are a ceramic composite comprising a ceramic filler embedded by a ceramic matrix.

13. The method of any one of claims 1, 2, 3 or 10 wherein said temperature ranges is from about 800° C. to about 1450° C.

14. The method of claim 1 wherein said precursor metal is selected from the group consisting of aluminum, titanium, tin, zirconium, hafnium, and silicon.

15. The method of claim 1 wherein said oxidation reaction product comprises an oxide, a nitride or a carbide.

16. The method of claim 1 wherein said oxidation reaction product comprises aluminum oxide, aluminum nitride, tin oxide, silicon carbide, titanium nitride, zirconium nitride, or hafnium nitride.

* * * * *

UNITED STATES PATENT AND TRADEMARK OFFICE
CERTIFICATE OF CORRECTION

PATENT NO.  : 4,884,737

DATED       : December 5, 1989

INVENTOR(S) : Newkirk et al.

It is certified that error appears in the above-identified patent and that said Letters Patent is hereby corrected as shown below:

Column 1, line 20: change "coplanr" to --coplanar--.
Column 1, line 49: change "metalsin" to --metals in--.
Column 3, line 26: change "operation." to --operation,--.
Column 3, line 29: change "4713,360, issued Decc." to --4,713,360, issued Dec.--.
Column 4, line 2: after "1984" insert a comma.
Column 5, line 67: change "embient" to --ambient--.
Column 6, line 10: change "bondng" to --bonding--.
Column 6, line 54: change "flate" to --flat--.
Column 8, line 20: change "Procelain" to --Porcelain--.
Column 8, line 25: after "therebetween" start a new paragraph and insert --The above setup was placed into a furnace supplied with air, and heated up over 3 hours to 1100°C. The--.
Column 8, line 36: change "magnificatin" to --magnification--.
Column 8, line 66: delete "p2".
Column 10, line 19: change "ranges" to --region--.

Signed and Sealed this

Twenty-first Day of December, 1993

Attest:

BRUCE LEHMAN

*Attesting Officer*      Commissioner of Patents and Trademarks